United States Patent
Serafini et al.

(10) Patent No.: US 8,002,475 B2
(45) Date of Patent: Aug. 23, 2011

(54) PROTECTION DEVICE FOR A SPEED SENSOR

(75) Inventors: Andrea Serafini, Pinerolo (IT); Massimo Russo, Turin (IT)

(73) Assignee: Aktiebolaget SKF, Goteborg (DE)

( * ) Notice: Subject to any disclaimer, the term of this patent is extended or adjusted under 35 U.S.C. 154(b) by 477 days.

(21) Appl. No.: 11/353,450

(22) Filed: Feb. 14, 2006

(65) Prior Publication Data

US 2006/0188189 A1 Aug. 24, 2006

(51) Int. Cl.
*F16C 41/00* (2006.01)
*F16C 32/00* (2006.01)

(52) U.S. Cl. ......................... 384/624; 384/448

(58) Field of Classification Search .................. 384/448, 384/544, 137, 174, 624; 324/173, 174
See application file for complete search history.

(56) References Cited

U.S. PATENT DOCUMENTS

| 5,143,458 A * | 9/1992 | Alff et al. ....................... 384/448 |
| 5,640,087 A * | 6/1997 | Alff ............................... 324/173 |
| 5,747,987 A * | 5/1998 | Smith ....................... 324/207.13 |
| 5,803,419 A * | 9/1998 | Nicot ......................... 248/224.7 |
| 6,232,772 B1 | 5/2001 | Liatard et al. |
| 6,400,135 B1 | 6/2002 | Skoff et al. |

FOREIGN PATENT DOCUMENTS

JP 7-333238 12/1995

* cited by examiner

*Primary Examiner* — Thomas R Hannon
*Assistant Examiner* — Alan B Waits
(74) *Attorney, Agent, or Firm* — Merchant & Gould P.C.

(57) ABSTRACT

Protection device for a speed sensor, the sensor being provided with a reading surface which is arranged at a first determined distance from an encoder of a contact rolling bearing, and the protection device being coupled to the contact rolling bearing, and presenting a housing for the sensor, and at least one scraping element which is arranged in such a way as to face the encoder itself in order to remove any eventual impurities from the encoder.

8 Claims, 2 Drawing Sheets

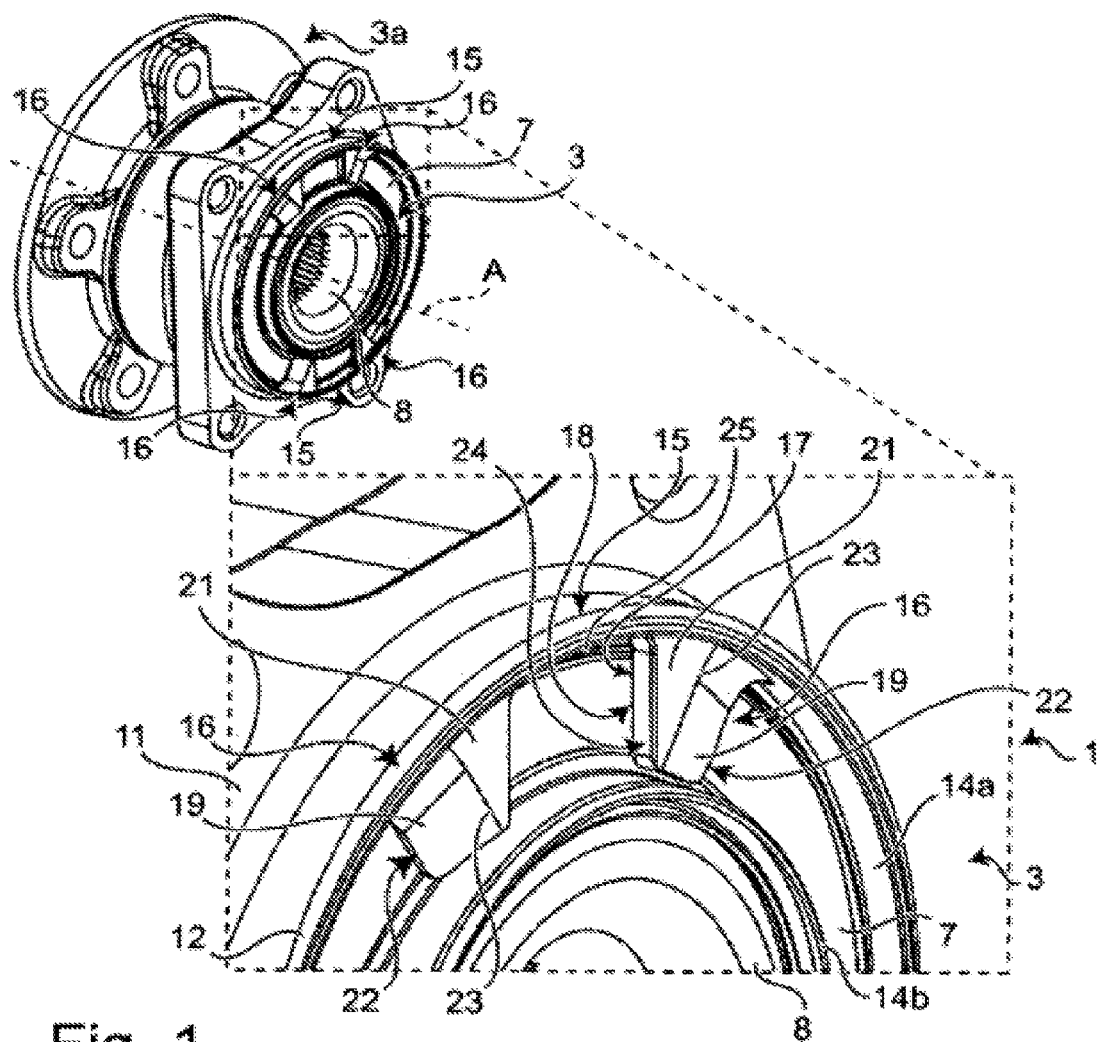
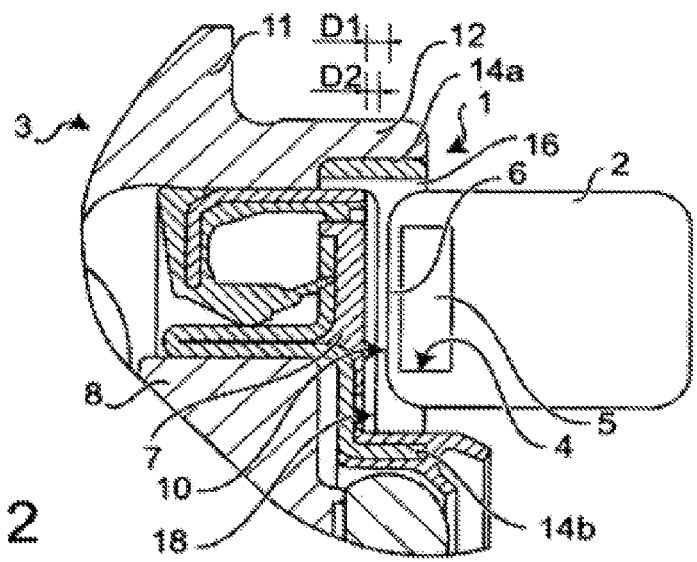
Fig. 1
Fig. 2

PROTECTION DEVICE FOR A SPEED SENSOR

BACKGROUND OF THE INVENTION

The present invention refers to a protection device for a speed sensor.

In general, in order to measure the angular speed of rolling contact bearings, it is well known to use speed sensors which face an encoder which is integral with a rotating race of a rolling contact bearing, and provided with a reading surface which is arranged at a determined distance from the encoder, and it is also well known to protect these speed sensors, and above all their reading surfaces, by means of protection devices, which are installed on the rolling contact bearing and which comprise a housing for the sensor and, according to the case in point, either a bellows made of rubber material which is arranged in such a way as to close the housing, or, in the simplest form of manufacture, a wall which is made of rubber material and which is arranged at the bottom of the housing between the encoder and the reading surface in order to adhere to the reading surface itself and insulate it completely from the outside.

In both the cases which have just been described, the protection device, while having been shown to be sufficiently reliable in terms of providing protection against the majority of external polluting agents, presents some disadvantages when, subsequent to some particular uses of the rolling contact bearing, some particles of mud are present, which, as they can stick to the encoder, can also impact on the reading surface in such a way as to cause progressive wear and therefore reduce the quality of the signal.

SUMMARY OF THE INVENTION

The aim of the present invention is to produce a protection device for a speed sensor, which will provide a simple and cost-effective solution to the disadvantages described above.

According to the present invention, a protection device for a speed sensor will be produced, the sensor being provided with a reading surface which is arranged at a first determined axial distance from an encoder of a rolling contact bearing, and the protection device being coupled to the rolling contact bearing, and comprising a housing for the sensor; the protection device being characterised by the fact of comprising at least one scraping element which is arranged in such a way as to face the encoder up from/above the housing in the direction of rotation of the encoder itself in order to remove any eventual impurities from the encoder.

BRIEF DESCRIPTION OF THE DRAWINGS

The present invention will now be described with reference to the attached drawings, which illustrate a non-limiting form of embodiment of the present invention and in which:

FIG. 1 is a perspective view, with a detail on an enlarged scale, of a first preferred form of embodiment of the protection device for a speed sensor which is the subject of the present invention;

FIG. 2 is a section view on an enlarged scale of a detail which is shown in FIG. 1;

DETAILED DESCRIPTION OF THE PREFERRED EMBODIMENTS

Figure 3:
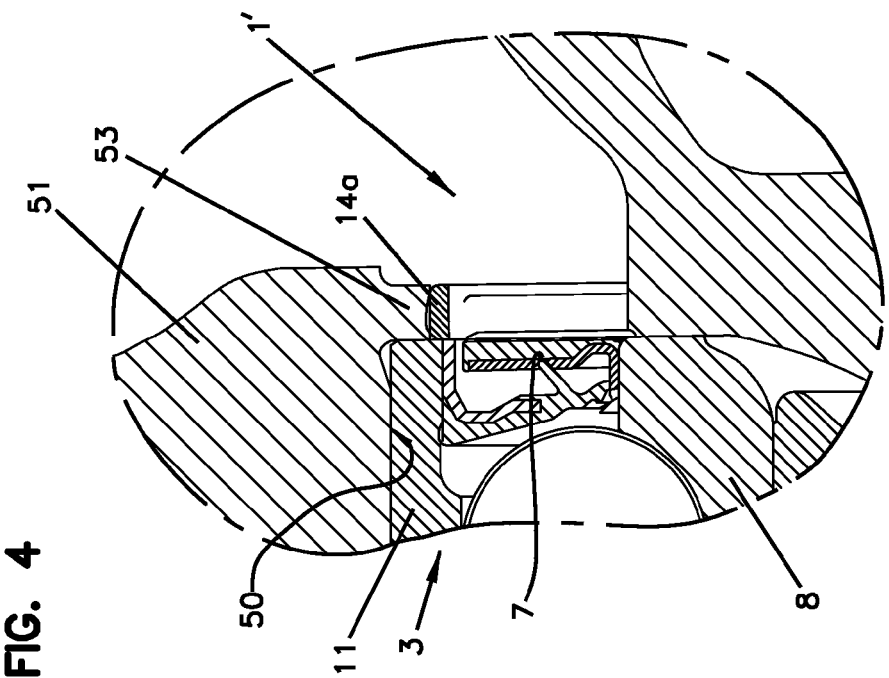
FIG. 3 illustrates, in a perspective view, a second preferred form of embodiment of the protection device for a speed sensor which is shown in FIG. 1.

With reference to the attached drawings, the number 1 indicates a protection device, in its entirety, for a speed sensor 2 which is suitable for measuring the angular speed of a rolling contact bearing 3.

In particular, in the form of embodiment which is illustrated, the rolling contact bearing 3 is an integral part of a wheel hub unit, to which the description which follows will make reference without, however, losing any of its general nature as a result.

According to what is better illustrated in FIG. 2, the sensor 2 comprises an inner housing 4, which houses a reading chip 5, and which is provided, on the part which is turned towards the bearing 3, with a frontal protection membrane 6 for the chip 4.

The sensor 2 faces an encoder 7 which is integral with an inner rotating race 8 of the bearing 3, and the membrane 6 presents a reading surface 10 which is arranged at a determined axial distance D1 from the encoder 7 itself. In particular, the bearing 3 presents a rotation axis A, and both the encoder 7 and the surface 10 are arranged transverse to the axis A at a distance of D1 from each other. In addition, the bearing 3 comprises a fixed race 11, which is co-axial to the axis A, and which is mounted outside the race 8, and which is provided with an outer axial annular border 12.

The device 1 is supported by the race 11 in a position which is axially frontal to the encoder 7, and it comprises a rigid support race 14a which is mounted inside the border 12, and two pairs of scraping tiles 16 which are arranged along the race 14a diametrically opposite the axis A, and in an axially symmetrical position in relation to the axis A itself.

The two tiles 16 of each pair 15 are integral with the race 14a, and they extend starting from the race 14a itself towards the axis A and towards an annular body 14b, which is part of the inner race 8 of the bearing 3, and is axially aligned with and co-axial to the border 12, and is arranged substantially in contact with the tiles 16 themselves. In addition, the two tiles 16 of each pair 15 define in relation to each other and with the races 14a and 14b a housing 17, and are suitable for removing any eventual impurities from the encoder 7 in such a way as to protect the sensor 2 which is arranged inside one of the two housings 17.

Each tile 16 is arranged in such a way as to face the encoder 7 above the relative housing 17 in the direction of rotation of the encoder 7 itself, and presents a respective base surface 18, which is opposite and parallel to the encoder 7, and which is arranged at an axial distance D2 from the encoder 7, the distance D2 being less than the dimensions of the distance D1.

Each tile 16 comprises a respective tapering portion 19 which increases in the relative direction of rotation of the encoder 7 and starting from the relative surface 18, and an outlet portion 21 which is integral with the relative tapering portion 19 and which is arranged below the tapering portion 19 itself in the relative direction of rotation of the encoder 7.

In particular, each tapering portion 19 presents a respective entry border 22 which is arranged along a respective radial direction in relation to the axis A, and which ends in an exit edge 23 which is arranged parallel to the relative border 22 and which is connected to the relative portion 21, which, instead, presents a constant axial thickness, and is delimited, on one side by the relative edge 23, and on the side which is circumferentially opposite the edge 23, by a face 24 which is transverse to the surface 18 and parallel to the face 24 of the tile 16 of the relative pair 15. The face 24 and the edge 23 are orientated in such a way as to confer on the relative outlet portion 21 the shape of a flat triangle in a section which is transverse to the axis A.

Each housing 17 is delimited on the opposing sides by the faces 24 of the tiles 16 of the same pair 15, and is radially delimited by a circumferential section 25 of the race 14a which is closed by the tiles 16 themselves, and by the race 14b in such a way that, once a sensor 2 has been introduced inside it, at least the surface 10 will be insulated from the outside and will above all be protected by the scraping tiles 16 from the presence of impurities which are I direct contact with the encoder 7.

As has already been indicated, the protection device 1 which has been described above has a specific and functional use in the field of bearings 3 for wheel hub units as, in this case, there is a considerable chance that particles of mud might adhere to the encoder 7, which means that there is also a considerable danger that such particles of mud, if not removed, could impact on the surface 6 in such a way as to cause, in the long term, a reduction in the quality of the measurement of the angular speed of the bearing 3.

The presence of the protection device 1 also prevents particles of mud from entering inside the housing 17 due to the fact that such particles are intercepted by the tiles 16 in order to be first removed from the encoder 7 by the tapering portions 19, and then disposed of towards the outside of the housing 17 by the outlet portions 21 whatever the direction of rotation of the encoder 7 might be.

Finally, it should be underlined that the presence of two housings 17 which are arranged in diametrically opposite positions along the race 14a permits greater flexibility in terms of mounting the protection device 1 onto a bearing 3.

Figure 4:
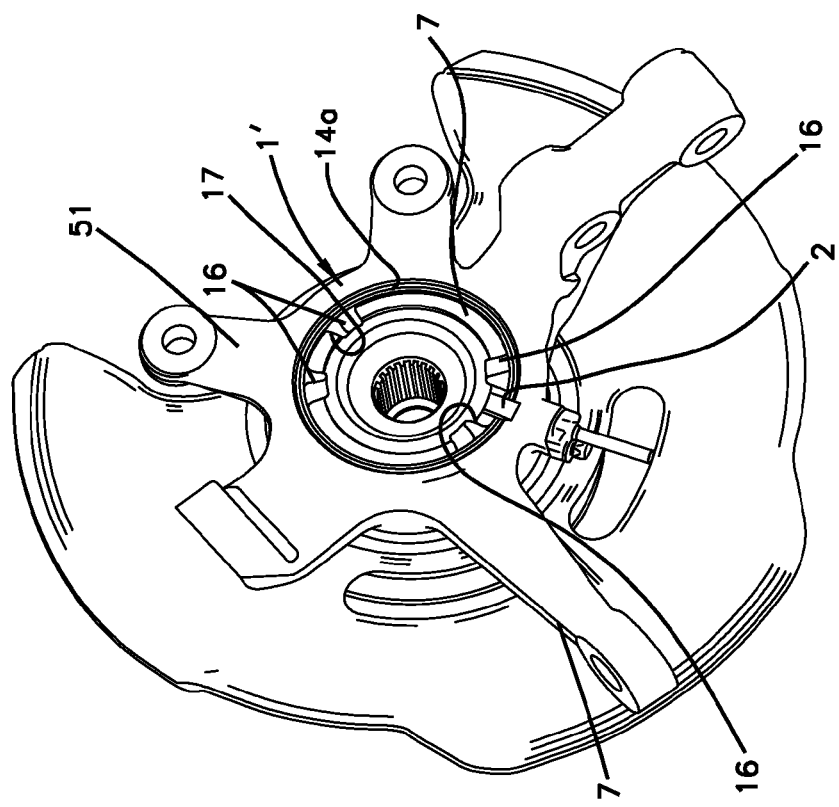
FIG. 4 illustrates, in axial section and on an enlarged scale, a particular of FIG. 3.

In the form of embodiment which is illustrated in FIGS. 3 and 4, the rolling contact bearing 3 is not integral with a wheel hub unit, but it is mounted in a cylindrical seat 50 of a knuckle 51. In this embodiment, the fixed race 11 is not provided with any annular border 12, but it abuts a shoulder 53 which limits the seat 50 and which directly supports the device 1.

The device 1', as illustrated in FIGS. 3 and 4, is supported by the shoulder 53 in the same position above described in respect to the bearing 3 and in respect to the encoder 7, and the race 14a is mounted inside the shoulder 53.

The main difference form the device 1' as described in FIGS. 3 and 4, and the device 1 as describe in FIGS. 1 and 2 consists on the fact that the device 1 is mounted directly onto the bearing 3 meanwhile the device 1' is mounted onto an element, that is the knuckle 51, which is not an integral part of the bearing 3. But in both these two cases, the device 1' faces directly the encoder 7 and the sensor 2 is arranged inside one of the housings 17.

The two embodiments of the protection device for a speed sensor device as above described are aimed to demonstrate that this protection device could be coupled to different kind of bearings in different kind of fitting ups.

Moreover, it is intended that the present invention should not be limited to the forms of embodiment which are herein described and illustrated, which are to be considered as examples of forms of embodiment of the protection device for a speed sensor, which might instead by subject to further modifications relating to the shape and disposition of its parts and to details pertaining to construction and assembly.

The invention claimed is:

1. Protection device for a speed sensor, the sensor being provided with a reading surface which is arranged at a first determined axial distance from an encoder of a rolling contact bearing, and the protection device being coupled to the rolling contact bearing; the protection device comprising:
   a first pair of scraping tiles, each of the scraping tiles having a scraping edge;
   a rigid support mounted on a border of the rolling contact bearing and supporting the first pair of scraping tiles;
   wherein the rigid support is defined by a race mounted inside the border, and wherein the scraping tiles are integral with the race and the first pair of scraping tiles is arranged with the sensor annularly intermediate the scraping tiles and with the sensor spaced annularly apart from each of the scraping tiles, and wherein each of the scraping tiles tapers substantially continuously from the race to the scraping edge and is arranged to lead the sensor in a respective direction of rotation of the encoder.

2. Protection device according to claim 1, wherein each scraping tile comprises a respective base surface, which is opposite and parallel to the encoder, and which is arranged at a second determined axial distance from the encoder.

3. Protection device according to claim 2, wherein each scraping tile comprises a respective tapering portion which increases in a respective circumferential direction of the encoder and which starts from the respective base surface.

4. Protection device according to claim 3, wherein each scraping tile comprises an outlet portion which is integral with the respective tapering portion and which is arranged to follow the tapering portion in the respective circumferential direction of the encoder.

5. Protection device according to claim 4, wherein the outlet portion comprises a triangular shape.

6. Protection device according to claim 5, the rigid support being mounted on a fixed race of the rolling contact bearing, and the scraping tiles stretching radially towards a radial inside of the rigid support.

7. Protection device according to claims 6, wherein the scraping tiles are mounted independently of the sensor.

8. Protection device according to claims 5, comprising a second pair of scraping tiles which is arranged along the rigid support diametrically opposite the first pair of scraping tiles.

* * * * *